UNITED STATES PATENT OFFICE.

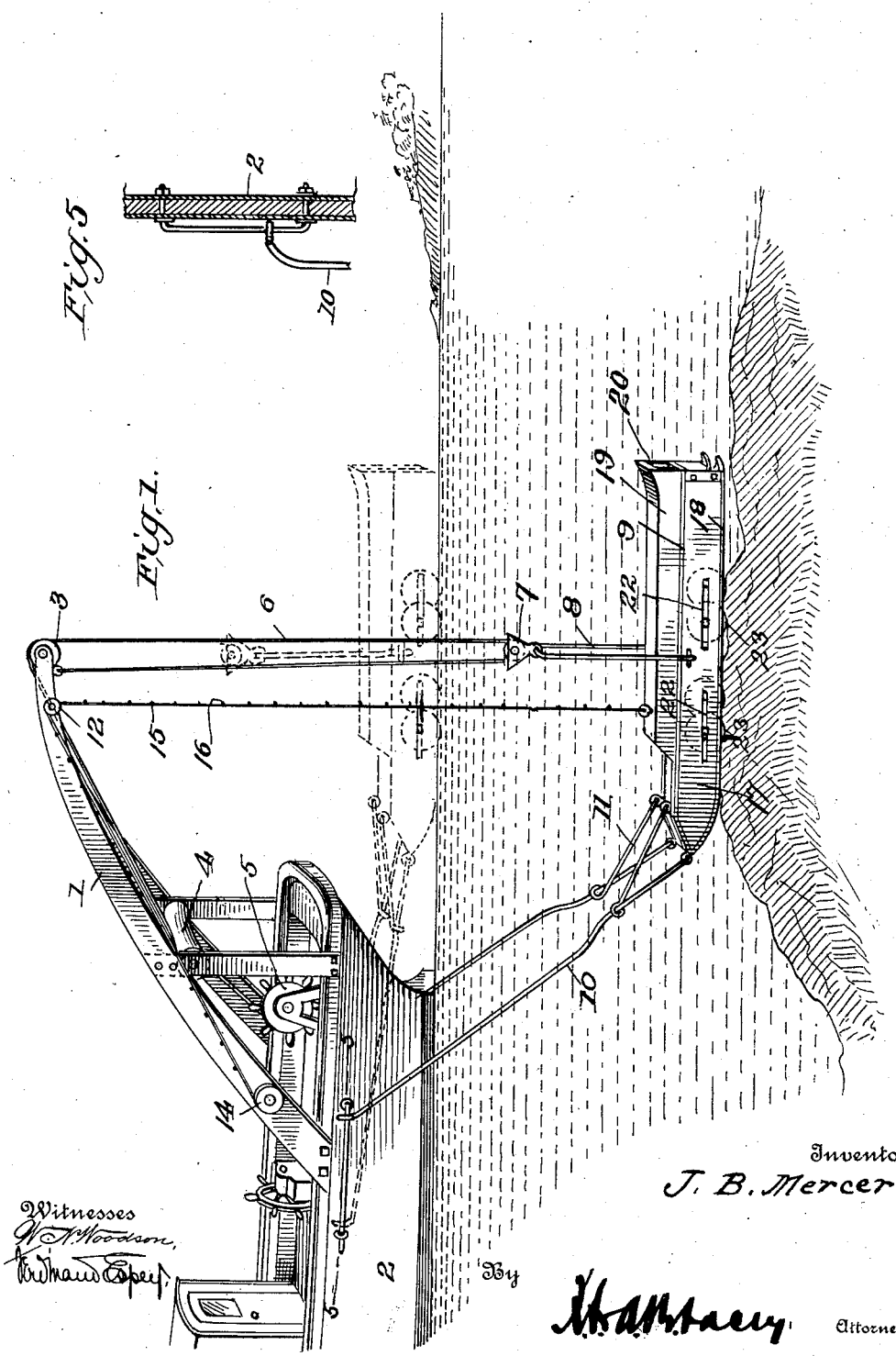

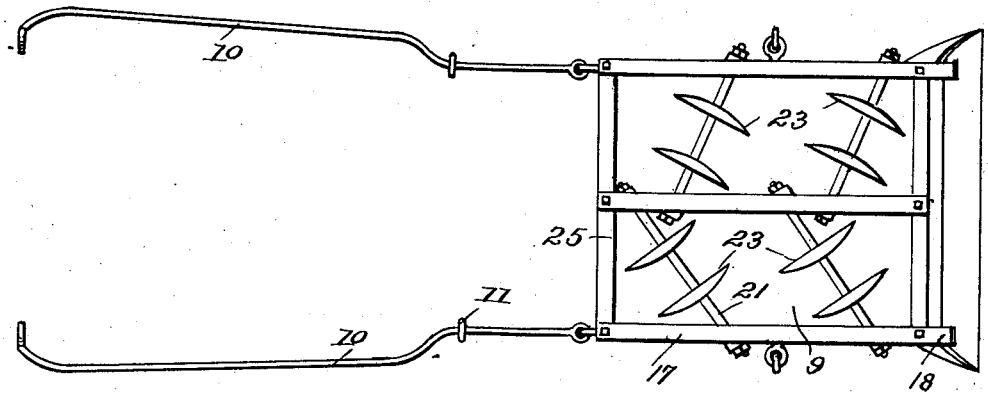
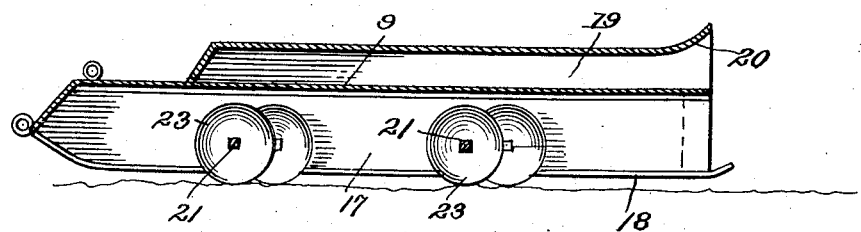
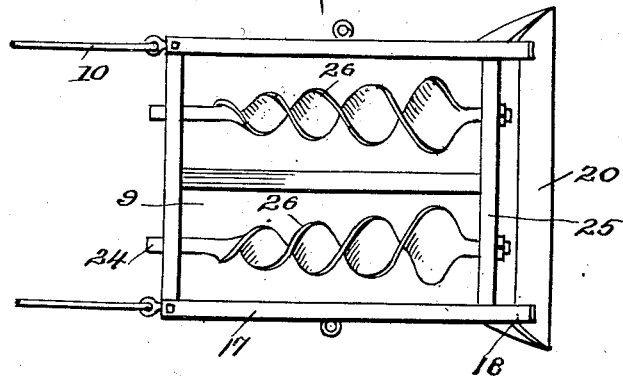

JOHN B. MERCER, OF WILMINGTON, NORTH CAROLINA.

CHANNEL-PLOW.

1,062,924.  Specification of Letters Patent.  Patented May 27, 1913.

Application filed March 22, 1912. Serial No. 685,601.

*To all whom it may concern:*

Be it known that I, JOHN B. MERCER, citizen of the United States, residing at Wilmington, in the county of New Hanover and State of North Carolina, have invented certain new and useful Improvements in Channel-Plows, of which the following is a specification.

This invention has relation to plowing apparatus especially adapted to be used upon river bottoms and other water courses and operating with tide or current, and has for its object to provide an apparatus adapted to be connected with a power propelled vessel and so positioned that the soil engaging member may travel along the bottom and loosen the soil, leaving the same in fine condition to be washed away by the tide or current of the water.

With the above object in view, the structure includes davits which are adapted to be mounted upon the stern portion of the vessel and a cable is trained along and about the davits and is connected with a hood of peculiar configuration and to which are adjustably attached soil engaging and cutting members. Means is connected with the davits and the hood and is adapted to indicate the depth at which the cutting members are operating below the surface of the water. Bars are pivotally connected with the sides of the vessel and extend down into the water and are connected at their lower ends with the forward end portions of the hood. Braces or links extend from the intermediate portions of the said bars and are connected at their rear ends with the top portion of the hood.

Further objects and advantages will appear in the following description, it being understood that various changes may be made in the details of construction, arrangement and proportions of the parts without departing from the scope of the invention as defined by the appended claims.

For a full understanding of the invention reference is to be had to the following description and accompanying drawings, in which:

Figure 1 is a perspective view showing the plowing apparatus attached to a vessel and indicating the apparatus raised above the surface of the water in dotted lines; Fig. 2 is a bottom plan view of one form of the soil engaging part of the apparatus; Fig. 3 is a longitudinal sectional view of the part as shown in Fig. 2; Fig. 4 is a bottom plan view of a modified form of soil engaging part of the apparatus. Fig 5 is a detail sectional view of part of the vessel showing the manner in which the plowing apparatus is connected with the same.

Corresponding and like parts are referred to in the following description and indicated in all the views of the accompanying drawings by the same reference characters.

The plowing apparatus includes davits 1 which are mounted upon the stern of the vessel, indicated at 2, and which are connected together at their rear ends. The vessel 2 is power driven and may be of any desired pattern. A pulley 3 is supported at the upper rear ends of the davits 1 and a drum 4 is supported at the upper intermediate portions of the said davits. A winding drum 5 is journaled upon the stern portion of the vessel, and any suitable means may be provided for operating the drum. A cable 6 is connected at one end with the upper rear ends of the davits 1 and extends down and supports a pulley block 7. The said cable then extends up and passes over the pulley 3, thence over the elongated concave drum 4, thence down and around the winding drum 5. A bail 8 is pivotally connected with the pulley block 7 and the ends of the said bail are pivotally connected with the side portions of a hood 9. This hood is of especial design and will be explained in detail hereinafter. Bars 10 are pivotally connected at their upper ends with the sides of the vessel 2 and are pivotally connected at their lower ends with the forward end of the hood 9 at the side portions thereof. Link braces 11 engage the intermediate portions of the bars 10 and are pivotally connected at their rear ends with the top of the hood 9 at points behind the forward end thereof. The braces 11 may or may not slide on the bars 10. As shown in the drawings, they are disposed to slide, but this is not essential to the operation of the device.

A pulley 12 is mounted upon one of the davits 1 and a winding drum 14 is journaled at any suitable point upon the deck of the vessel 2, or one of the davits 1. Any suitable means may be provided for turning the drum 14. A sounding line 15 is arranged to wind upon the drum 14 and passes over the pulley 12 and extends down and is connected with the top of the hood 9. The sounding line 15 is provided with a series of graduations 16 which are located upon that portion of the line 15 which hangs vertically when the hood 9 is upon the bottom of the river or water course. Therefore by observing the positions of the graduations 16 with relation to the surface of the water it is easy to determine at what depth the soil engaging members carried by the hood are operating below the surface of the water.

The hood 9 includes runners 17 which extend longitudinally of the hood in parallel relation and which are provided along their lower edges with metallic strips 18. This hood is open at its rear end and partially closed at its forward end. A sheet metal top plate 19 extends along the top of the hood 9. The plate 19 extends back to the rear ends of the runners 17 and then flares upwardly and laterally as at 20. It will be noted that this flared plate will cause suction in the wake of the device.

Several different arrangements of the soil engaging members may be resorted to and provided within the hood 9. As illustrated in Fig. 3 the arrangement consists of non-circular shafts 21 (preferably square in transverse section). These shafts 21 are adjustably held in slots 22 provided in the runners 17, but are held against rotation in the said slots. Disks 23 are fixed to the intermediate portions of the shafts 21 and lie between the runners with their lower edge portions projecting below the lower edges of the said runners. The gangs of disks at one side of the hood 9 may be positioned at desired angles with relation to the gangs of disks at the other side of the hood and the outer ends of the gangs may be disposed to cut and turn the material outwardly or inwardly, as desired.

In the form of the soil engaging member as illustrated in Fig. 4 shafts 24 extend longitudinally of the hood and are held against rotation between cross bars 25 which connect the runners 17 together. Helical members 26 are fixed to the shafts 24 and have edge portions which project below the lower edge of the runners 17. The twists of the members 26 increase in diameter from the forward to the rear ends of the member 26.

As the vessel moves over the surface of the water, the hood 9 and its attached parts trail behind and the soil engaging members enter the bottom of the river or water course and cut into the soil and stir the same. The soil thus loosened is carried away by the tide or flow of the current and thus a channel may be opened in the bed. By winding the cable 6 upon the drum 5, the hood 9 may be held at a desired distance below the surface of the water, and consequently when it is passing over deep holes the soil engaging members will be above the bottom, but as soon as it passes over shallow places the soil engaging members will come in contact with the bottom and stir the same, as indicated. Inasmuch as the soil engaging members are held in fixed positions during the operation of plowing, they may be turned at intervals and secured so that their edge portions which have been dulled may be moved up under the hood, while their unused sharp edge portions may be projected below the level of the lower edges of the runners. As the hood 9 is drawn along the bottom, and in view of the fact that it is substantially closed at its forward end, the soil engaging members will have contact with the bottom and support the same sufficiently, and as the apparatus moves rapidly in a forward direction, the water flowing over the rear part of the hood 9 will have a tendency to cause a swirling action just behind the said hood. This will produce a trailing and following effect upon everything within the influence of its weight. Thus influenced the loosened soil will move rapidly behind the hood and will follow the tide or current of the stream and eventually deposit at some deep point out of the channel which is being cut.

Having thus described the invention, what is claimed as new is:—

1. An apparatus for loosening submerged soil comprising a hood, soil engaging members located thereunder, means for connecting the hood with a vessel, a cable connected with the hood, and a sounding line connected with the hood.

2. An apparatus for loosening submerged soil comprising a hood, said hood including runners, agitating means supported within the hood, said hood being formed with curved suction creating means disposed to create suction at the rear end of the hood as the apparatus is drawn through the water.

3. An apparatus for loosening and distributing submerged soil comprising a hood open at both ends, the opening in the front of the hood being restricted by an obliquely disposed member, agitating means supported within the hood, and suction creating means disposed at the rear of the hood.

4. An apparatus for loosening and distributing submerged soil comprising a hood, said hood including forwardly disposed sloping members, rearwardly disposed suction creating means, and soil agitating means disposed within the hood.

5. An apparatus for loosening and distributing submerged soil comprising a hood open at both ends, the opening in the front of said hood being smaller than the opening at the rear, an agitating mechanism supported within the hood, and a flared plate disposed at the rear of said hood.

In testimony whereof I affix my signature in presence of two witnesses.

JOHN B. MERCER.

Witnesses:
FRANK. P. MEIER,
SAM S. DREW.

Copies of this patent may be obtained for five cents each, by addressing the "Commissioner of Patents, Washington, D. C."